July 14, 1959

G. A. KELLEY 2,894,376

AIR CONDITIONING APPARATUS AND METHOD

Filed Oct. 20, 1955

INVENTOR.
G. A. KELLEY
BY
Charles S. Haughey
atty

July 14, 1959 G. A. KELLEY 2,894,376
AIR CONDITIONING APPARATUS AND METHOD
Filed Oct. 20, 1955 2 Sheets-Sheet 2

INVENTOR.
G. A. KELLEY
BY
Charles S Haughey

United States Patent Office 2,894,376
Patented July 14, 1959

2,894,376

AIR CONDITIONING APPARATUS AND METHOD

Gilbert A. Kelley, Toledo, Ohio, assignor to Surface Combustion Corporation, Toledo, Ohio, a corporation of Ohio Application October 20, 1955, Serial No. 541,727

9 Claims. (Cl. 62—271)

This invention pertains to a method of, and apparatus for, conditioning air. It is particularly directed to a new air conditioning system as applied to a wind tunnel where test operations may require the air conditioning apparatus to handle air to be conditioned at very high pressures for many tests and at sub-atmospheric pressures (vacuum) for other tests. It is also directed to the problem of producing very cold and very dry air, which may be as cold as 60° F. to 85° F. below zero, continuously, without formation of frost on the surfaces used for such cooling.

Operation of dehumidification, or air conditioning, equipment to produce dew points below 32° F., the freezing temperature of the moisture present in air (at atmospheric pressure), ordinarily requires either duplication of cooling equipment so that cooling coils which have become inefficient due to a coating of frost and ice may be defrosted while other equipment handles the load, or cooling equipment which can cool air to temperatures well below its original dew point and below 32° F. without formation of frost. In some cases, such as wind tunnel applications, it is also necessary that such equipment be efficient when conditioning air at temperatures below —60° F., and in some cases at least as low as —85° F. Attempts to apply solid desiccants to such problems have met with the difficulty that, especially in pressure installations, two desiccant beds are required so that one can be regenerated while the other is on stream. Liquid desiccants of various kinds have been tried, and generally become very viscous at some low temperature. The most satisfactory, solutions of lithium chloride in water, become viscous somewhat below —50° F., and especially below —65° F. for the range of concentration preferred for safe trouble-free operation.

The present invention is a satisfactory solution to all the foregoing problems, and provides reliable, efficient, economic apparatus for continuous conditioning and dehumidification of air.

For further consideration of what I believe novel and my invention, refer to the drawing, specification, and claims.

Figure 1:
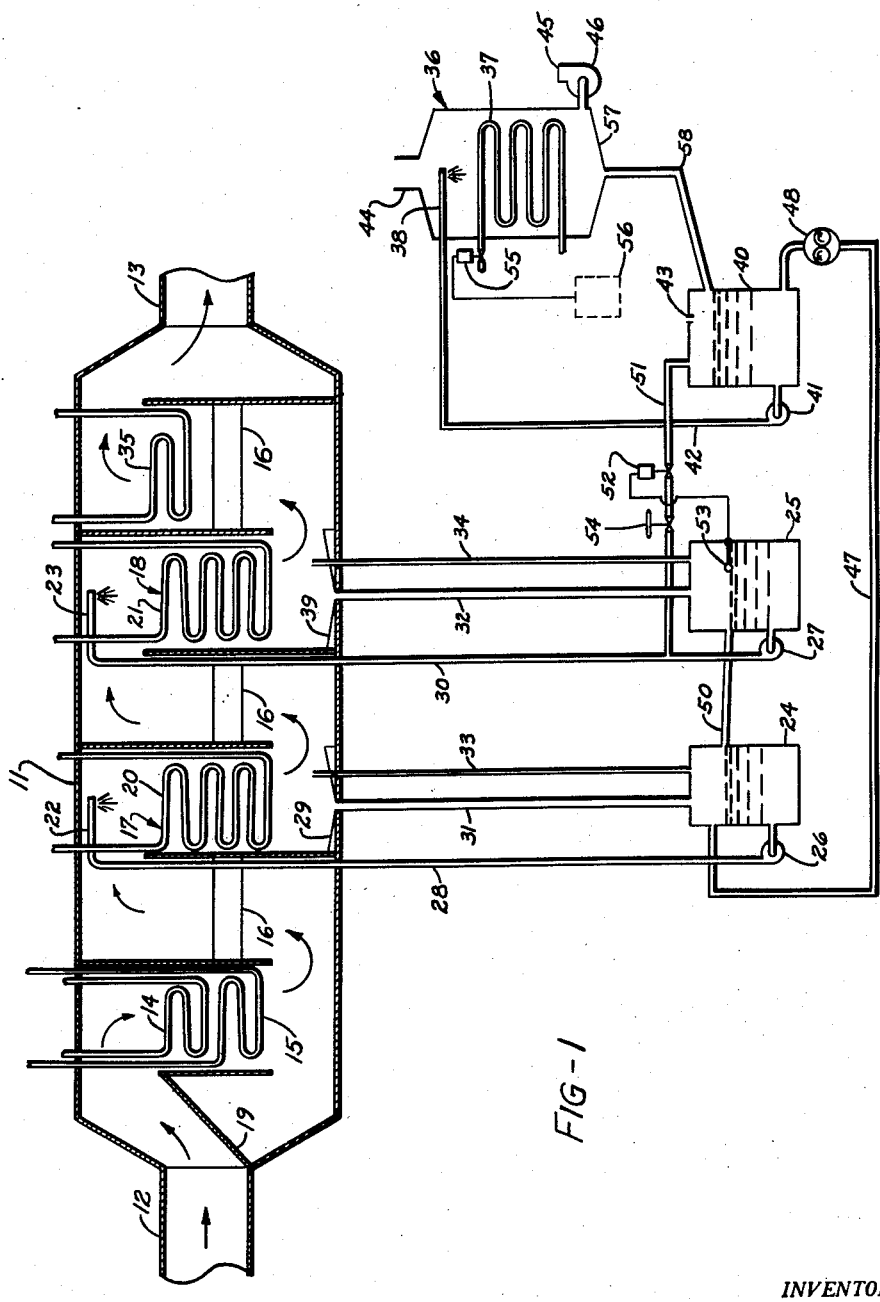
Figure 1 depicts a preferred form of my invention, as applied to the conditioning of air for wind tunnel testing use.
Figure 2:
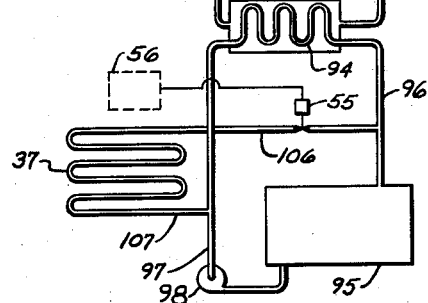
Figure 2 shows a detail of controls embodied in Figure 1.
Figure 2:
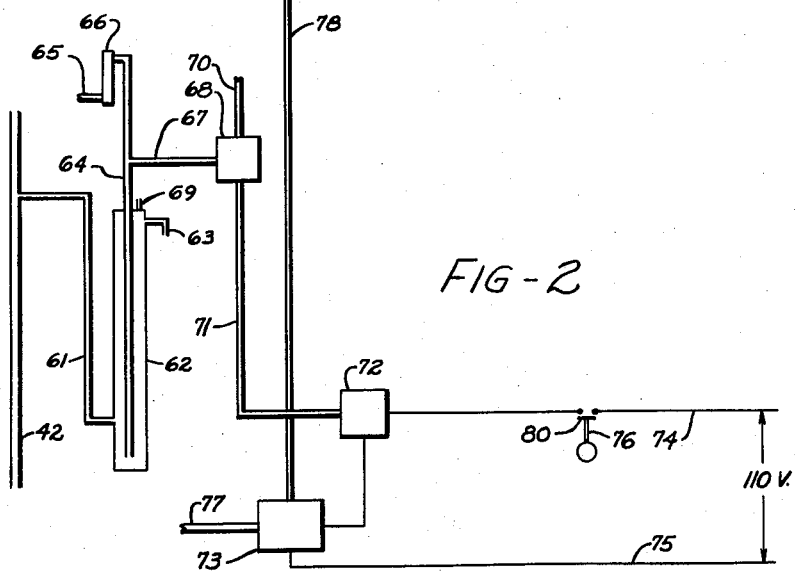

According to the present invention, as illustrated in Figures 1 and 2, a hygroscopic liquid, such as a water solution of lithium chloride, is circulated through a contactor for contacting air to be dehumidified. The contactor is a pressure vessel designed to withstand the high and low pressures at which it is desired to operate the system. The concentration of the solution will be controlled as will be explained in some detail, and its temperature will also be controlled, preferably by a cooling coil in the contactor over which the solution is circulated and through which a refrigerant is passed. The solution will then be circulated through a regenerator, which may be of the air type in which the solution is heated and subjected to a stream of scavenger air to which excess moisture is released, the regenerated solution being cooled and returned to the contactor. The regenerator will be at atmospheric pressure, and only the solution must change pressure going to and from the contactor pressure vessel.

With a lithium chloride solution at a concentration between about 22% and 37% by weight salt in water, the dehumidification may safely be conducted at —60° F., and with concentrations between about 25% and 36% the solution may be cooled to about —80° F. without freezing or salting out. However, below —60° F. to —65° F., the solution becomes viscous and is impractical to use. Reliable, safe operation requires maintenance of concentrations well within the safe operating range.

To obtain the most reliable and economic operation, the air to be conditioned is first dried in the contactor to a dew point below the solution temperature, and below the freezing temperature of the water in the air stream, and is then subsequently further cooled by a refrigerated surface coil to a temperature above its dew point. Thus the latent heat load of condensing the moisture is removed at a higher temperature, and there is less volume and weight of air to be further cooled in the final, frost-free, cooling operation. It will be appreciated that by cooling the air to a dry bulb temperature just above the dew point temperature in this manner, this apparatus may produce a substantially saturated conditioned air, having a relative humidity just under 100%, without formation of frost on the refrigerated surface cooler because its temperature is maintained above the dew point temperature of the air it contacts, yet the air is cooled to temperatures well below the freezing temperatures of its contained moisture, and the excess of that moisture is continuously removed.

In Figure 1, air contacting apparatus is enclosed in a pressure vessel 11 with necks 12 and 13 through which air from a wind tunnel, for instance, may be passed. Air pressure in such an application is subject to large variations according to the nature of the tests being conducted and the air conditioning apparatus must be ruggedly built. Air ducted from the wind tunnel enters neck 12, is deflected by baffle 19, and passes by cooling coils 14 and 15, the former containing water and the latter a refrigerant such as ammonia. The air is then directed through an eliminator 16 which eliminates water droplets condensed from vapor in the cooled air and carried thereby. This air then passes through two contactor units 17 and 18 which comprise coils 20 and 21 through which ammonia is passed and spray bars 22 and 23 which spray hygroscopic liquid from sumps 24 and 25 over the coils 20 and 21. This liquid is supplied by means of pumps 26 and 27 and pipes 28 and 30. It is collected by drain boards 29 and 39 and drains back to the sumps by gravity through drain pipes 31 and 32. These sumps are vented to the pressure vessel by vent lines 33 and 34 to maintain equal pressures therein. Additional eliminators 16 are placed after contactor units 17 and 18 to trap hygroscopic liquid that may be entrained in the air. The cool and relatively dry air is finally passed by an after-cooling coil 35 to further cool it to the desired temperature. This conditioned air then is ducted through neck 13 back to the wind tunnel.

A regenerator unit 36 is located outside the pressure vessel; being subjected only to atmospheric air permits the construction of this unit to be lighter weight and less expensive. It further permits atmospheric air to be used to carry off the water from the heated hygroscopic liquid rather than employing the relatively costly wind tunnel air for this purpose. The regenerator unit comprises a heating coil 37, through which steam or hot water is passed, and a spray bar 38, which sprays hygroscopic liquid from sump 40 over heating coil 37. The liquid is supplied by a pump 41 through pipe 42. It drains to the sump 40 from collector plate 57, forming the bottom of regenerator 36, through drain pipe 58. This sump 40 may be open or vented to the atmosphere through vent 43. Atmospheric air is drawn through duct 44 past coil 37 and again returned to the atmosphere through duct 45 by means of a blower 46.

The regenerated hygroscopic liquid must then be passed to the pressurized contactor units from the atmospheric sump. In addition, the level in each of sumps 24 and 25 must be maintained reasonably constant in spite of variations in the rate of water absorption and degree of "carry-off" of the liquid by the air being conditioned. Both of these factors affect the liquid level and each will vary for each contactor unit at a given air flow and pressure and for various other air flows and pressures. To accomplish the above, a pipe 47 is connected from sump 40 below the liquid level therein to sump 24 with a positive displacement and substantially constant flow pump 48 placed in the pipe. A positive, constant flow is thus established from sump 40 to sump 24. Gravity flow pipe 50 is connected between sumps 24 and 25 which are at the same pressure to allow liquid from the first to drain to the second when the level in the first is above a certain point. The flow through this drain pipe will equal the volume moved by pump 48 with a slight additional volume according to the amount of water absorbed by contactor unit 17. A pipe 51 is also connected from the discharge side of pump 27 back to sump 40. This pipe 51 contains a flow control valve 52 which is responsive to the liquid level in sump 25 by means of a float 53. Pump 27 is sized to maintain a positive head regardless of the pressure or vacuum in sump 25; however, this positive head will still vary. Consequently, a pressure regulator 54 is placed in pipe 51 upstream of flow control valve 52 to reduce the pressure upstream of the valve and maintain it constant. A small, constant flow is thus assured through valve 52, when opened. The upstream pressure, as determined by regulator 54, is established sufficiently large to produce a flow through valve 52, when opened, that exceeds the flow through pump 48 plus the water removed by the two contactors.

The heating medium in coil 37 is regulated by valve 55 which is controlled by a system generally indicated by dotted lines 56 and illustrated in Figure 2. A float 76 in sump 40 and responsive to the level of hygroscopic liquid therein, controls lead 74 which, along with lead 75, supplies current to an electro-pneumatic switch 73. When this switch receives current, it opens and permits air pressure in air supply line 77 to be transmitted through line 78 to valve 55 which is thereby opened.

As a safety device, hygroscopic liquid is supplied from pipe 42 to supply line 61 and flows upward through vertical tube 62 and out drain line 63 which may lead back to sump 40. An air pipe 64 extends through the top of tube 62 to a point near the bottom thereof. Air is supplied this tube 64 from a source (not shown), through supply line 65, and flow meter 66. Air pressure in pipe 64 is transmitted to a pressure controller 68 through line 67. The controller 68 has air supplied to it through line 70 and the outlet air pressure in line 71 is regulated by the controller according to the pressure transmitted to it from air pipe 64. A pressure electric switch 72 is, in turn, operated in an on-off manner in response to the air pressure in line 71 connected to it. This switch 72, as will be more fully explained later, will open if the concentration of the hygroscopic liquid tends to become excessive. This may occur if float 76 is caused to remain in its upper position and does not properly function as the main density control.

In operation of this apparatus, air may flow through neck 12 from the wind tunnel at 60 p.s.i. and 150° F. dry bulb with the requirement it be cooled to −60° F. After passing through water cooling coil 14 and refrigerant cooling coil 15 the dry bulb temperature will be decreased, in this case, to approximately 35° F. with a dew point equal to the same. Condensate water from this air will then partially drop out and the rest separated by eliminator 16. After passing through contactors 17 and 18 the resulting air entering after cooler 35 will have approximately a −47° F. dry bulb temperature and a −68° F. dew point. To further decrease the temperature to −60° F. dry bulb, the after-cooler 35 will contain relatively expensive −75° F. refrigerant. The flow of refrigerant through the surface coil, or after cooler, 35 will be controlled in any conventional way to maintain the desired dry bulb temperature in the air leaving the exit end 13 of the duct, or pressure vessel, 11. The necessary quantity of this refrigerant to cool the air to −60° F. dry bulb is kept to a minimum for two reasons: First, very little water remains in the air thus minimizing the cooling load since a portion of the refrigerant required to cool the moisture is thereby eliminated. Second, and most important, because the dew point of the air is decreased to a point where no frost forms on the coils, maximum cooling efficiency is assured. It may be noted here that an after cooling coil is used in place of a contactor unit since, at temperatures below −60° F., the hygroscopic liquid tends to be excessively viscous. Thus, for such temperature applications, the final stage consists of cooling only with the previous stage containing the final dehumidification operation.

Pumps 26 and 27 pump the hygroscopic liquid continuously through spray bars 22 and 23 and over coils 20 and 21. The liquid then drains back to sumps 24 and 25 through drain pipes 31 and 32 along with the moisture absorbed from the air. Additional regenerated liquid is fed at a constant rate from regenerator sump 40 by pump 48 to sump 24. An equal amount of liquid then flows through pipe 50 to sump 25. The level in the latter sump is maintained level by flow control valve 52, float 53, and pressure regulator 54 which modulate flow back to sump 40. This system also allows the regenerated liquid to be first supplied to sump 24 whose corresponding contactor unit 17 must remove the bulk of the water.

The hygroscopic liquid in sump 40 is passed through pipe 42 and spray bar 38 and over heating coil 37 by pump 41. The heating medium in coil 37 heats this liquid, driving off excess water which is carried away by atmospheric air drawn in duct 44 and expelled through duct 45 by blower 46.

The amount of water expelled depends in part on the vapor pressure of the water compared to that of the scavenger air. If the regenerator is contained in the pressure vessel, the pressure of the air therein, except when under vacuum, acts to seriously inhibit the expulsion of water from the liquid and adversely affects the regeneration of it. Thus the efficiency of the regenerator unit is markedly improved by locating it under ambient air pressure. The amount of water expelled is also determined by the amount of heat in coil 37 which depends on the amount of flow of the heating medium as controlled by valve 55, the latter operating in an on-off manner. As previously mentioned, this valve is actuated in response to the density of the hygroscopic liquid by means of the control system indicated generally at 56. This system, as shown in Figure 2, operates as follows: A float 76 is located in sump 40 and is adjusted so that bar 80 makes contact with a lead 74 when the level of the liquid in sump 40 is high and thus diluted. The contact will be broken only when the liquid is normally or excessively concentrated so that the level in sump 40 accordingly falls a pre-determined amount.

With lead 74 closed and pressure switch 72, to be discussed presently, likewise closed, current is supplied to electro-pneumatic valve 73 through leads 74 and 75. This valve is supplied air through supply line 77 and, when current is received, pressure therein is transmitted to line 78 which is connected to valve 55. Such a rise in pressure in line 78 causes valve 55 to open and admit the heating medium to heating coil 37. The resultant heat in coil 37 causes more water to be driven from the hygroscopic liquid and become further concentrated. This action occurs until the level of liquid in sump 40 falls sufficiently to cause float 76 and bar 80 to drop and break contact with lead 74.

It is desirable to maintain the hygroscopic liquid at a maximum concentration for the temperature at which it operates to obtain maximum efficiency of its water absorbing abilities. However, if the liquid is a salt solution, such as lithium chloride and water, an excessive concentration will cause the salt to precipitate out. If this happens, the salt must be cleaned from the system, heated, and again formed into solution. This is a time consuming and expensive operation.

To prevent the above from occurring, in case float 76 should stick in its upper position or pump 48 fails, a density control device is employed in the control system. Hygroscopic liquid slowly flows through tube 62 from line 61 and out drain line 63. The height of this liquid in tube 62 is constant, of course, maintained by drain line 63. Air is passed through line 65, flow meter 66, and down air pipe 64 where it exits at its lower end and bubbles to the top of the liquid and out vent 69. As the concentration of the liquid increases due to more water being removed in regenerator unit 36, the density of the liquid increases and the effective head of it in tube 62 likewise increases. The air pressure in pipe 64 accordingly increases which is transmitted to pressure controller 68. As this pressure rises above a pre-determined point as set in this instrument, it decreases the air pressure in line 71 which causes pressure switch 72 to break contact. Lead 74 is thus opened, stopping current to electro-pneumatic valve 73 which decreases the air pressure in line 78 and closes valve 55. This device then acts as an upper limit control.

As the liquid again becomes diluted, the density again decreases and the pressure in air pipe 64 drops. When this falls below an amount set in controller 68, the latter increases air pressure in line 71 to pressure switch 72 and the switch once again closes.

Figure 3:
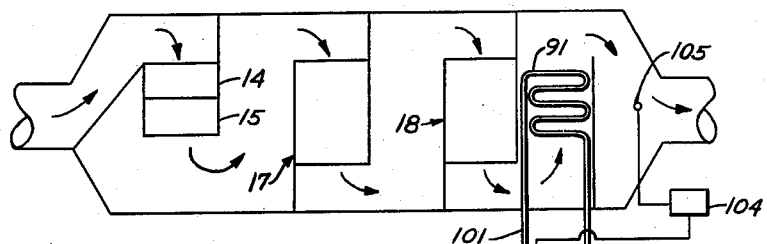
Figure 3 illustrates another form of my invention.

In some applications it is desired to heat the air after the drying and cooling processes and in such cases an after-heating coil 91 will replace the after-cooling coil 35. Such a coil and its supply system is illustrated in Figure 3 whose controls will be similar to that of Figure 2 and whose preceding conditioning apparatus is similar to that of Figure 1, hence being only schematically shown in Figure 3, the coils and contactor units being represented by rectangles.

An anti-freeze liquid is recirculated through coil 91 from a heat exchanger 92 by means of pump 93. Heat exchanger 92 has coil 94 around which the liquid passes and through which the steam from boiler 95 passes. Pump 98 circulates steam or hot water from boiler 95 to heat exchanger 94 by means of pipe 96, and a pipe 97 carries this heating medium back to the boiler. An anti-freeze liquid is used as the heating medium in place of water to prevent freezing in coil 91 should pump 93 fail.

A by-pass line 100 is connected between pipes 101 and 102 which carry the liquid to and from coil 91. An electrically operated three-way valve 103 regulates flow through pipes 100 and 101 and this is controlled by a temperature responsive instrument 104 which measures the temperature of the conditioned air by a temperature bulb 105. A branch line 106 supplies steam to regenerator coil 37 which flows back to pipe 97 through line 107. Control valve 55 is situated in line 106 which controls the steam supplied to coil 37. This again is operated by the control system generally indicated at 56.

In operation of this apparatus, the exiting air may be warmed to 40° F. dry bulb by coil 91. This temperature is maintained by instrument 104 and bulb 105. When the air temperature exceeds the desired point, electrical three-way valve 103 is shifted to by-pass the heating liquid through line 100 back to the heat exchanger.

Steam is supplied through coil 94 at a relatively constant amount with some variation present due to steam being diverted to regenerator heating coil 37 as controlled by valve 55. The latter, being connected to pipes 96 and 97, permits the single source of steam to serve two purposes and without affecting the temperature of the exiting air due to the aforementioned temperature control system.

The preceding specification is intended to serve as an illustration and not as a limitation. Modifications of this apparatus can be incorporated without departing from the scope of my invention or teachings contained herein.

I claim:

1. Dehumidifying apparatus for dehumidifying and cooling air at non-atmospheric pressure comprising, in combination: a pressure vessel; means for moving said air through said vessel; a first cooling coil through which coolant is passed, located in said vessel; first spray means for spraying hygroscopic liquid over said first coil; a first sump located below said vessel; first vent means for equalizing the pressure between said vessel and said first sump; first drain means for collecting in said first sump liquid from said first spray means; a first supply pipe connecting said first sump to said first spray means; a first pump in said first supply pipe; a second cooling coil through which coolant passes, located in said vessel downstream of said first coil; second spray means for spraying hygroscopic liquid over said second coil; a second sump located below said vessel; second vent means for equalizing the pressure between said vessel and said second sump; second drain means for collecting in said second sump liquid from said second spray means; a second supply pipe connecting said second sump to said second spray means; a second pump in said second supply pipe; wall means forming a regenerator chamber located outside said vessel; means for moving atmospheric air through said chamber; a heating coil in said chamber through which a heating medium is passed; third spray means for spraying hygroscopic liquid over said heating coil; a third sump; third drain means for collecting in said third sump liquid from said third spray means; a third supply pipe connecting said third sump to said third spray means; a third pump in said third supply pipe; a circulating pipe connecting said third sump to said first sump; a positive displacement pump in said circulating pipe; a gravity-flow pipe connecting said first sump to a lower portion of said second sump; a return pipe connecting said second supply pipe at a point downstream of said second pump to said third sump; and flow control means in said return pipe for controlling flow through said return pipe responsive to the level of hygroscopic liquid in said second sump.

2. Air conditioning apparatus comprising in combination: a plurality of cooling coils through which coolant is passed; means for moving air past said coils; spray means for spraying hygroscopic liquid over at least a portion of said coils; sump means for collecting said liquid after passing over said coils; supply means for supplying said liquid to said spray means from said sump means; regenerator means comprising a heating coil for regenerating said hygroscopic liquid; an after heating coil located in the air stream downstream of said cooling coils; a heat exchanger; pipe means for recirculating fluid through said heat exchanger and said after heating coil;

by-pass means in said pipe means for by-passing said fluid around said after-heating coil in response to the temperature of the air downstream of said after heating coil; heating medium supply means for heating and circulating a heating medium through said heat exchanger; heating coil supply means for supplying a portion of said heating medium to said regenerator heating coil; and control means in said heating coil supply means for regulating the flow therethrough.

3. Air conditioning apparatus for conditioning air subject to varying pressure comprising, in combination: a plurality of cooling coils through which coolant is passed; means for moving a stream of said air past said coils; spray means for spraying hygroscopic liquid over said coils; sump means for collecting said liquid after passing over said coils; supply means for supplying said liquid to said spray means from said sump means; regenerator means subjected to ambient air pressure comprising a heating coil for regenerating said hygroscopic liquid; an after heating coil located in the air stream downstream of said cooling coils; a heat exchanger; a first pipe connecting an outlet of said heat exchanger to an inlet of said after-heating coil; a second pipe connecting an outlet of said after-heating coil to a corresponding inlet of said heat exchanger; pump means in one of said first and second pipes for recirculating fluid through said after-heating coil and said heat exchanger; a by-pass pipe connecting said first and second pipes; control means responsive to the temperature of air downstream of said after-heating coil for controlling flow through said after-heating coil and said by-pass pipe; a source of heating medium; a third pipe connecting said source through said heat exchanger and back to said source; a fourth pipe connecting said third pipe upstream of said heat exchanger to said regenerator heating coil; a fifth pipe connecting said regenerator heating coil to said third pipe downstream of said heat exchanger; and valve means in one of said fourth and fifth pipes for controlling the flow of heating medium therethrough.

4. Air conditioning apparatus for dehumidifying and cooling air subject to non-atmospheric pressure comprising, in combination: a pressure vessel; a cooling coil through which coolant is passed, located in said vessel; contactor spray means for spraying hygroscopic liquid over said coil; means for moving air to be conditioned through said vessel in contact with said cooling coil and hygroscopic liquid; a contactor sump located below said vessel; drain means for collecting in said contactor sump liquid from said contactor spray and for equalizing the pressure in said vessel and said contactor sump; a supply pipe for connecting said contactor sump to said contactor spray; a pump in said supply pipe; wall means forming a regenerator chamber located outside of said vessel; a heating coil located within said regenerator through which a heating medium is passed; means for controlling the flow of said heating medium in response to the concentration of said liquid; means for moving atmospheric scavenger air past said heating coil; regenerator spray means for spraying hygroscopic liquid over said heating coil; a regenerator sump for collecting hygroscopic liquid from said regenerator spray means; a circulating pipe connecting said regenerator sump to said contactor sump for conveying concentrated hygroscopic liquid from the regenerator sump to the contactor sump; means in said circulating pipe for pumping said hygroscopic liquid against the pressure differential between the regenerator sump and contactor sump; a return pipe connecting said supply pipe at a point downstream of said pump to said regenerator sump for conveying hygroscopic liquid from the contactor sump to said regenerator sump; and a flow control valve in said return pipe for controlling the flow therethrough responsive to the level of hygroscopic liquid in said contactor sump.

5. Air conditioning apparatus for cooling and dehumidifying air subject to non-atmospheric pressure comprising, in combination: a pressure vessel; a cooling coil through which coolant is passed, located in said vessel; spray means for spraying hygroscopic liquid over said cooling coil; means for moving air to be conditioned through said vessel in contact with said cooling coil and hygroscopic liquid; a contactor sump for collecting hygroscopic liquid from said spray means; a supply pipe for connecting said contactor sump to said spray means; a pump in said supply pipe; a regenerator located outside of said pressure vessel for concentrating said hygroscopic liquid; a circulating pipe connecting said regenerator to said contactor sump for conveying concentrated hygroscopic solution from the regenerator to the contactor sump; a return pipe connecting said contactor sump to said regenerator for conveying hygroscopic liquid from the contactor sump to the regenerator; and means in one of said circulating and return pipes for pumping said hygroscopic liquid against the pressure differential between the regenerator and contactor sump; and pressure reducing means in the other of said circulating and return pipes.

6. Apparatus according to claim 5 wherein the return pipe connects said supply pipe downstream of said pump to said regenerator.

7. Apparatus according to claim 6 wherein flow control means is located in said return pipe for controlling the flow therethrough responsive to the amount of water absorbed by said hygroscopic liquid in said pressure vessel.

8. Air conditioning apparatus for dehumidifying air subject to non-atmospheric pressure comprising, in combination: a pressure vessel; a contact surface in said vessel; spray means for spraying hygroscopic liquid over said surface; means for moving air to be conditioned through said vessel in contact with said surface and said hygroscopic liquid; a contactor sump for collecting hygroscopic liquid from said spray means; means for cooling said hygroscopic liquid; a supply pipe for connecting said contactor sump to said spray means; a pump in said supply pipe; a regenerator located outside of said pressure vessel for concentrating said hygroscopic liquid; a circulating pipe connecting said regenerator to said contactor sump for conveying concentrated hygroscopic solution from the regenerator to the contactor sump; a return pipe connecting said contactor sump to said regenerator for conveying hygroscopic liquid from the contactor sump to the regenerator; and means in one of said circulating and return pipes for pumping said hygroscopic liquid against the pressure differential between the regenerator and said contactor sump, and pressure reducing means in the other of said circulating and return pipes.

9. Air conditioning apparatus comprising, in combination: a duct having an inlet for receiving a stream of air to be conditioned and an outlet for delivering conditioned air; contacting means for contacting an air stream passing through said duct with a hygroscopic liquid; control means for controlling the temperature and concentration of the hygroscopic liquid in a manner to lower the dew point of said air stream to a temperature below the freezing temperature of water; and a surface cooler disposed in said duct downstream of said contacting means and maintained at a surface temperature below the freezing temperature of water and above said dew point temperature whereby the latent heat of the water is absorbed by the hygroscopic liquid at a relatively higher temperature, and subsequently the air stream is further cooled to a temperature below the freezing temperature of water without condensation of water as ice in the air stream in said duct and consequent frost formation on said surface cooler.

(References on following page)

References Cited in the file of this patent

UNITED STATES PATENTS

| | | |
|---|---|---|
| 683,492 | Pictet | Oct. 1, 1901 |
| 2,114,787 | Smith | Apr. 19, 1938 |
| 2,156,293 | Kaufman | May 2, 1939 |
| 2,159,276 | Lawless | May 23, 1939 |
| 2,269,053 | Crawford | Jan. 6, 1942 |
| 2,515,098 | Smith | July 11, 1950 |
| 2,556,250 | Bauman | June 12, 1951 |
| 2,587,485 | Kline | Feb. 26, 1952 |

FOREIGN PATENTS

| | | |
|---|---|---|
| 137,473 | Australia | June 1, 1950 |